(12) United States Patent
Kwak (10) Patent No.: US 7,745,715 B2
(45) Date of Patent: Jun. 29, 2010

(54) METHOD FOR GENERATING AUDIO DATA AND USER TERMINAL AND RECORD MEDIUM USING THE SAME

(75) Inventor: Sang-Yeop Kwak, Seoul (KR)

(73) Assignee: Gaonda Corporation, Mapo-Gu (KR)

( * ) Notice: Subject to any disclaimer, the term of this patent is extended or adjusted under 35 U.S.C. 154(b) by 163 days.

(21) Appl. No.: 11/912,415

(22) PCT Filed: Jan. 31, 2006

(86) PCT No.: PCT/KR2006/000332

§ 371 (c)(1),
(2), (4) Date: Oct. 24, 2007

(87) PCT Pub. No.: WO2006/115323

PCT Pub. Date: Nov. 2, 2006

(65) Prior Publication Data

US 2008/0223200 A1    Sep. 18, 2008

(30) Foreign Application Priority Data

Apr. 25, 2005    (KR) ...................... 10-2005-0034149

(51) Int. Cl.
*G10H 1/36*    (2006.01)
(52) U.S. Cl. .............................. 84/610; 84/609; 84/613; 84/634; 84/637; 84/649; 84/650; 84/666; 84/669
(58) Field of Classification Search ........................ None
See application file for complete search history.

(56) References Cited

U.S. PATENT DOCUMENTS

2006/0230910 A1*    10/2006    Song et al. .................... 84/616

FOREIGN PATENT DOCUMENTS

| JP | 2000-267652 A | 9/2002 |
| KR | 10-2001-54564 A | 7/2001 |
| KR | 10-2004-89421 A | 10/2004 |
| KR | 10-2005-78425 A | 8/2005 |
| KR | 10-2005-115648 A | 12/2005 |

* cited by examiner

*Primary Examiner*—Marlon T Fletcher
(74) *Attorney, Agent, or Firm*—Edwards Angell Palmer & Dodge LLP (57) ABSTRACT

Disclosed is a method for generating audio data automatically and a personal terminal and a recorded medium using the same. Disclosed method comprises the steps of: (a) detecting pitch of inputted sound source; (b) generating a unit tone data using detected pith variation information; (c) generating an interval code using ratio information of unit tones included in the unit tone data; (d) generating a harmony code based on the generated interval code; (e) generating an accompaniment template using the harmony code and pre-stored accompaniment related template; and (f) generating an audio data where main melody of the inputted sound source and the accompaniment data are merged. Users can generate polyphonic ringtone sound automatically through a personal terminal itself without downloading.

19 Claims, 8 Drawing Sheets

METHOD FOR GENERATING AUDIO DATA AND USER TERMINAL AND RECORD MEDIUM USING THE SAME

CROSS-REFERENCES TO RELATED APPLICATIONS

This application is a U.S. national phase application, pursuant to 35 U.S.C. 371, of PCT/KR2006/000332, filed Jan. 31, 2006, designating the United States and published on Nov. 2, 2006 as WO 2006/115323 A1, which claims priority to Korean application 10-2005-0034149, filed Apr. 25, 2005. The entire contents of the aforementioned patent applications are incorporated herein by this reference.

FIELD OF THE INVENTION

The present invention relates to a method for generating audio data automatically, more particularly to a method for generating ringtone sound in mobile terminal.

BACKGROUND OF THE INVENTION

In the whole world, the industry of ringtone in mobile phone possesses one of the biggest market in the mobile contents industry. A ringtone is generally provided by downloading through communication network, which is a charged sound source made by sound source provider. Price for downloading one ringtone is about 0.5$~3.0$, and copyright and neighboring right fees, and communication fee are included in the price. Increase of ringtone industry is due to desire for enjoying music of mobile generation and desire for expressing one's own individuality. In conventional ringtone service, as a pre-made ringtone is provided, copyright and neighboring right fees and communication fee are included in the price of a ringtone, and therefore, price for the ringtone is high.

While increase of ringtone industry is due to desire for expressing one's own individuality, the conventional method which provides pre-made ringtone does not meet various individuality of users.

Further, whenever user wants new ringtone sound, it has to download ringtone through network, which results in increase of inconvenience and communication fee.

On account of above mentioned problems, there is a need for new kind of ringtone service.

SUMMARY OF THE INVENTION

In order to solve above-mentioned problems of the conventional art, an object of the present invention is to provide a method for generating audio data automatically and a personal terminal and a recorded medium using the same that can generate ringtone sound automatically in personal terminal without downloading ringtone.

Another object of the present invention is to provide a method for generating audio data automatically and a personal terminal and a recorded medium using the same that can generate polyphonic ringtone sound using user's voice or sound generated by instrument play.

Still another object of the present invention is to provide a method for generating audio data automatically and a personal terminal and a recorded medium using the same that can generate various polyphonic ringtone sounds which meet user's individuality.

In order to achieve above-mentioned objects, according to an aspect of the present invention, there is provided a method for generating audio data automatically comprising the steps of: (a) detecting pitch of inputted sound source; (b) generating a unit tone data using detected pitch variation information; (c) generating an interval code using ratio information between unit tones included in the unit tone data; (d) generating a harmony code based on the generated interval code; (e) generating an accompaniment template using the harmony code and pre-stored accompaniment related template; and (f) generating an audio data where main melody of the inputted sound source and the accompaniment data are merged.

In the step (a), the pitch is detected for each frame having predetermined number of samples.

The step (b) comprises the steps of: determining if pitch difference of sequential frames is less than predetermined critical value; grouping sequential frames of which pitch difference is less than predetermined critical value; calculating average pitch of grouped sequential frames; and setting the average pitch as unit tone of grouped sequential frames.

The step (c) comprises the steps of: calculating ratio of sequential unit tones; and transforming the ratio into a predetermined value by referring to a transformation table for transforming calculated ratio.

In the step (d), the harmony code is generated using information of a harmony code database where harmony code information corresponding to each of interval code is stored.

The harmony code database stores plurality of harmony codes corresponding to one interval code in the form of matrix.

A number of harmony codes corresponding to one interval code are stored in the harmony code database, and one harmony code is selected by predetermined selection method among the harmony codes corresponding to one interval code.

The accompaniment related template comprises a rhythm template and a play template.

A number of rhythm templates and play templates are pre-stored, and selected rhythm template and play template by user are merged in generating the accompaniment template.

Rhythm of the rhythm template is outputted when the sound source is inputted.

According to another aspect of the present invention, there is provided a recorded medium readable by a digital processing device, tangibly embodying a program of instructions executable by the digital processing device for performing method of generating audio signal automatically, said method comprising the steps of: (a) detecting pitch of inputted sound source; (b) generating a unit tone data using detected pitch variation information; (c) generating an interval code using ratio information of unit tone included in the unit tone data; (d) generating a harmony code based on the generated interval code; (e) generating an accompaniment template using the harmony code and pre-stored accompaniment related template; and (f) generating an audio data where main melody of the inputted sound source and the accompaniment data are merged.

According to another aspect of the present invention, there is provided a personal terminal for generating audio signal automatically comprising: a pitch detection part for detecting pitch of inputted sound source and generating unit tone data using detected pitch variation information; an interval code generating part for generating an interval code using ratio information of unit tone included in the unit tone data; a harmony code generation part for generating a harmony code corresponding to the generated interval code using data stored in a harmony code database; an accompaniment template generation part for generating an accompaniment template using a harmony template generated based on the harmony code data generated by the harmony code generation part and pre-stored accompaniment related template; and an audio data generation part for generating an audio data by mixing main melody data generated through pitch analysis for the inputted sound source and the accompaniment template.

According to still another aspect of the present invention, there is provided a recorded medium readable by a digital processing device, tangibly embodying a program of instructions executable by a personal terminal for performing method of generating audio signal automatically, said method comprising the steps of: (a) detecting pitch of sound source inputted in the personal terminal; (b) generating a main melody data of the inputted sound source using the detected pitch information; (c) generating a harmony code appropriate for the main melody data by analyzing pattern information of the main melody data; and (d) generating an accompaniment template including the harmony code and generating an audio data by merging the accompaniment template and the main melody data.

According to still another aspect of the present invention, there is provided a personal terminal for generating an audio data automatically comprising: a pitch detection part for detecting pitch of sound source inputted in the personal terminal; a main melody data generation part for generating a main melody data of the inputted sound source using the detected pitch information; a harmony code generation part for generating a harmony code appropriate for the main melody data by analyzing pattern information of the main melody data; and an audio data generation part for generating an accompaniment template including the harmony code and generating an audio data by merging the accompaniment template and the main melody data.

DETAILED DESCRIPTION OF THE PREFERRED EMBODIMENTS

Hereinafter, the preferred embodiment of the present invention will be described with reference to the accompanying drawings.

The present invention provides a method for directly generating polyphonic ringtone sound in personal terminal without downloading ringtone sound. As the present invention relates to generating ringtone sound, the present invention will be mainly used in mobile terminal. However, it would be obvious to those skilled in the art that the technology of the present invention can also be applied to other personal terminals such as PDA, notebook, when alarm signal or other kinds of audio signal is necessary in personal terminal.

For automatic generation of ringtone, according to an embodiment of the present invention, a service provider provides an application that performs automatic generation of the ringtone, and the provided application is installed in the personal terminal for automatic generation of the ringtone.

According to another embodiment of the present invention, a memory chip storing program module that performs automatic generation of the ringtone is attached to a personal terminal for generation of the ringtone.

According to still another embodiment of the present invention, a module for automatic generation of the ringtone can be mounted to a personal device in production process without providing additional application or memory chip.

According to still another embodiment of the present invention, personal computer (PC) application for automatic generation of the ringtone is provided to users, and users can download the ringtone sound generated by the PC application from the PC.

Besides above mentioned embodiments, the method for automatically generating the ringtone sound can be performed in various ways, and it would be obvious to those skilled in the art that the simple variation of embodiment would not affect the spirit and scope of the present invention.

The method for generating the ringtone automatically is firstly described and embodiments for generating the ringtone automatically is described in this specification.

Figure 1:
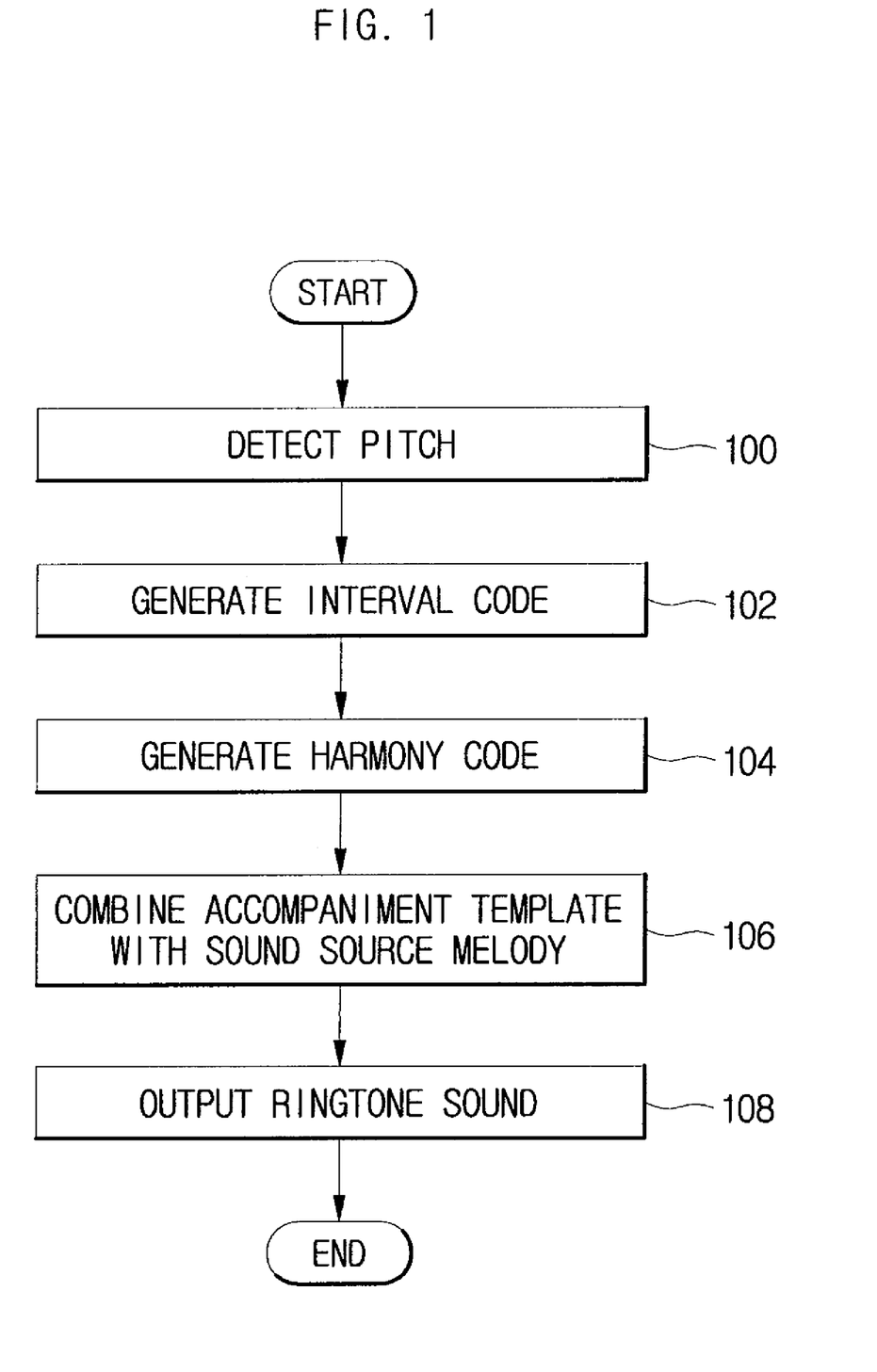
FIG. 1 is a flow chart illustrating whole process of generating the ringtone sound automatically according to a preferred embodiment of the present invention.

FIG. 1 is a flow chart illustrating whole process of generating the ringtone sound automatically according to a preferred embodiment of the present invention.

Referring to FIG. 1, the process for detecting pitch of sound source is firstly performed for automatic generation of the ringtone sound 100. In the present invention, a user firstly inputs sound source to be used as the ringtone sound, and ringtone sound corresponding to the inputted sound source is generated. For this process, pitch of the sound source is firstly detected. The sound source can be inputted in various ways. For example, user can sing for input of the sound source, or user can play an instrument for input of the sound source.

In pitch detection process, an audio data signal corresponding to inputted sound source through voice and instrument and so on is generated, and pitch is detected by analyzing frequencies of the generated audio data signal.

For detection of pitch, any frequency detection algorithm widely known in the art can be used. For example, fast fourier transform (FFT), auto correlation, AMDF algorithm can be used for detection of pitch, and other frequency detection algorithms can also be employed for detection of pitch.

When pitch detection for inputted sound source is completed, process for generating interval code is performed 102. The interval code is an information used for generating appropriate harmonic chords corresponding to the inputted sound source.

According to a preferred embodiment of the present invention, the interval code is generated using pitch variation rate of the sound source. For example, if detected pitch frequencies varies by 200 Hz, 400 Hz, and 100 Hz, the ratio of 200 to 400, and the ratio of 400 to 100 is sequentially calculated for generating interval code.

In music, the harmonic chord is set corresponding to variation of sound tone. For example, if sound tone varies by do-mi-sol, C chord is generally an appropriate chord, if sound tone varies by sol-si-re, G chord is generally an appropriate chord.

Therefore, in the present invention, variation of each pitch is coded and chord is outputted by using the coded information.

After interval code is generated, harmony code is generated 104. According to an embodiment of the present invention, database for storing harmony code adequate for each interval code is constructed, and harmony code corresponding to interval code is generated using information of the database.

Appropriate harmony depends on many factors. Appropriate harmony for same melody may vary according to genre of music or mood. Therefore, the harmony code database is preferred to have a number of harmony codes for one interval code.

When a number of harmony codes matching for one interval code are stored in the database, additional information is written for each of the harmony codes and one of the harmony codes is selected using the additional information. Method for one harmony code among a number of harmony codes for an interval code is described in more detail referring to another figure.

By above mentioned method, the harmony code is generated in real time based on variation of interval code.

After generation of harmony code is completed, process for combining original sound with accompaniment template based on the harmony code that has been generated corresponding to the original sound is performed 106. The accompaniment template is a base unit for generating final accompaniment, and it may comprise a harmony template, a rhythm template, and a play template.

The rhythm template and the play template are pre-stored in the database, and the rhythm template and the play template can be selected by user. According to an embodiment of the present invention, a number of rhythm templates including rhythm&blues, dance, pop, hiphop&funky, etc. are pre-stored in the database according to genre of music, the rhythm template that user selected is combined with the main melody of original sound.

After original sound is combined with accompaniment template, automatic generation of polyphonic ringtone sound data is completed, and the generated polyphonic ringtone sound is outputted 108.

Figure 2:
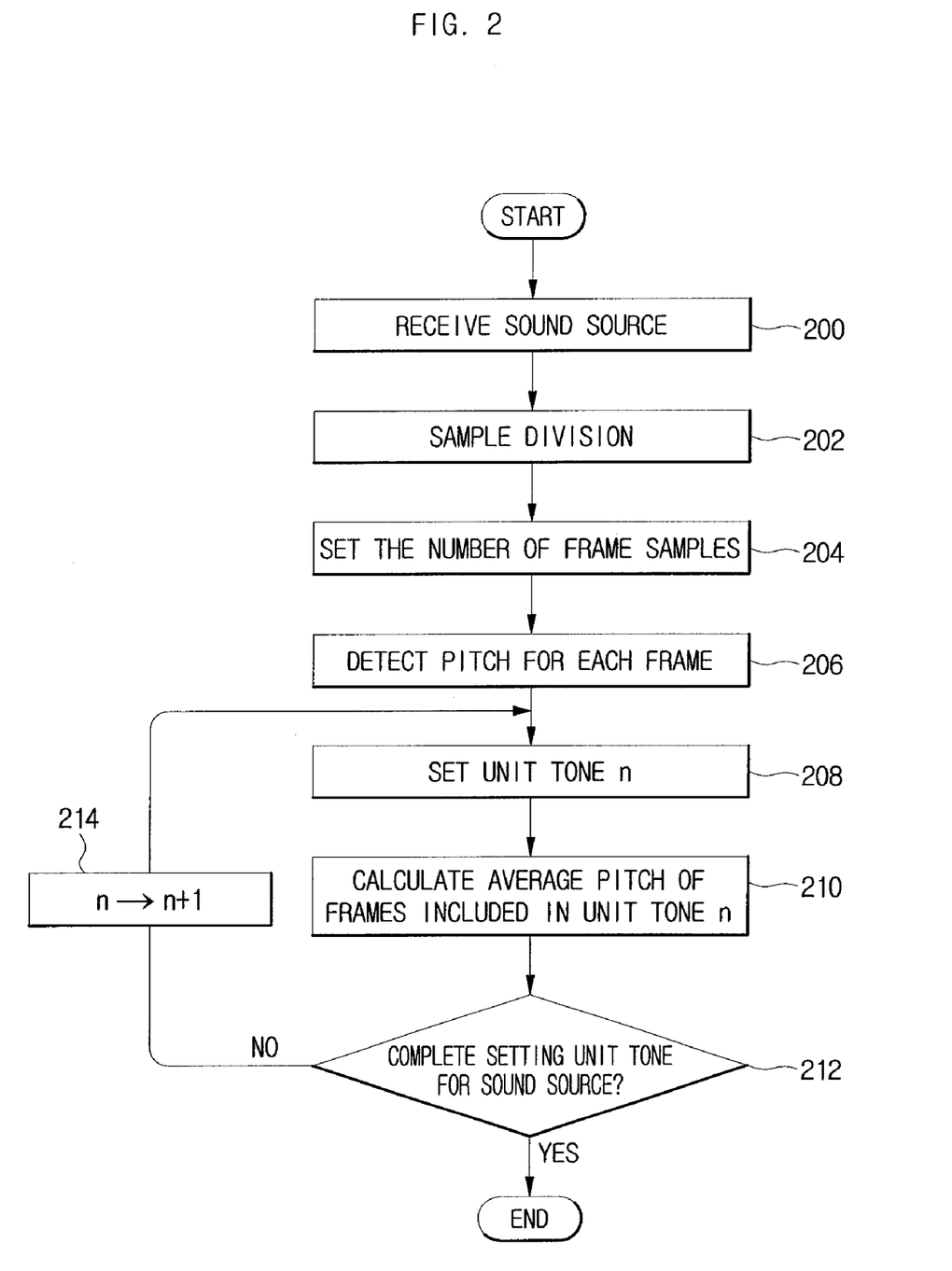
FIG. 2 is a flow chart illustrating process for detecting pitch according to a preferred embodiment of the present invention.

FIG. 2 is a flow chart illustrating process for detecting pitch according to a preferred embodiment of the present invention.

Referring to FIG. 2, sound source is inputted from the user 200. According to a preferred embodiment of the present invention, when user inputs sound source, rhythm can be provided to the user, and the user can input sound source based on the provided rhythm. As described above, user can input sound source by one's voice, or user can input sound source by playing an instrument. In case of personal terminal having microphone such as mobile phone, the sound source can be inputted through the microphone. In case of personal terminal such as PDA which does not have microphone, additional microphone can be attached to the personal terminal for input of the sound source.

If sound source is inputted, inputted signal is divided into a predetermined number of sample units 202. For example, the sample division may be performed at 32,000 samples/sec, and sampling time can be varied.

After sample division is completed, the number of samples in frame section is inputted from user 204. At this time, GUI (Graphic User Interface) for inputting the number of frame samples is displayed in the personal terminal. Of course, the number of samples in frame section can be set by default.

After the number of frame samples is determined, pitch of each frame is detected 206. Pitch can be detected by various algorithms. As described above, various frequency detection algorithms including fast fourier transform, auto correlation, and AMDF can be used, and modified algorithm based on the above mentioned algorithms can also be used.

When pitch of each frame is detected, pitch identity for each frame is analyzed and a unit tone 'n' is set 208.

According to a preferred embodiment of the present invention, in determining pitch identity, if pitch difference is less than predetermined critical value, the pitches of corresponding frames are regarded as same pitch. Assume that pitch of the first frame is 200, pitch of the second frame is 205, pitch of the third frame is 400, and pitch of the fourth frame is 500. When the critical value is set as 10, pitch of the first frame and pitch of the second frame is regarded as same pitch.

If pitch identity is determined, unit tone 'n' is set based on pitch identity determination, and frames with same pitch have same unit tone.

For example, as the pitches of first frame and second frame are same, the first frame and the second frame are set to be included in same unit tone 'n'. The third frame with different pitch from first and second frame is included in a unit tone 'n+1', and the fourth frame is included in a unit tone 'n+2'

After unit tone 'n' is set, average pitch included in unit tone 'n' is calculated 210. The average pitch of frames included in unit tone 'n' is set as the pitch of the corresponding unit tone.

After pitch for unit tone 'n' is set, same process is performed for unit tone 'n+1' and same processes are repeated for all unit tones of sound source.

Figure 3:
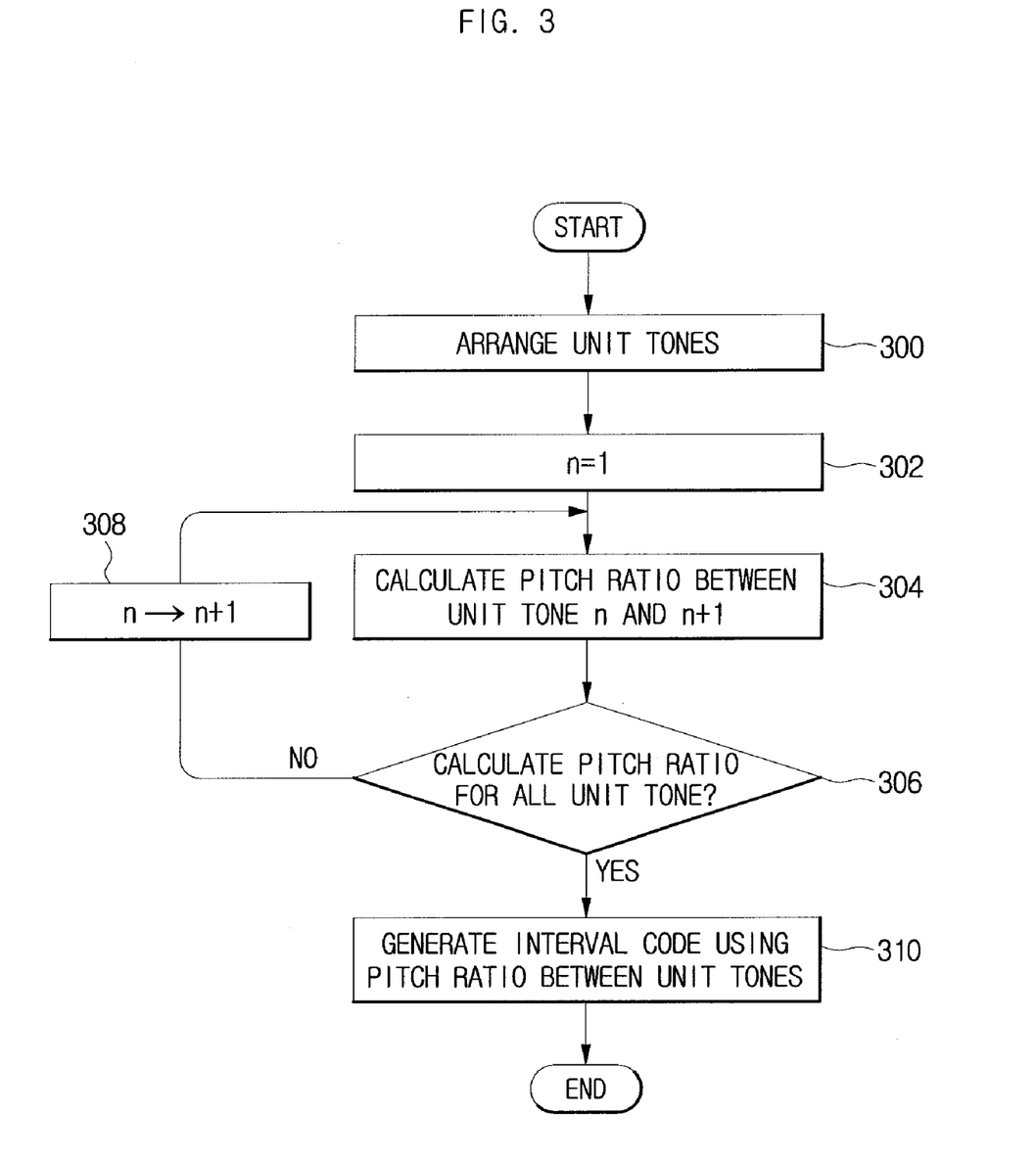
FIG. 3 is a flow chart for generating interval code according to a preferred embodiment of the present invention.

FIG. 3 is a flow chart for generating interval code according to a preferred embodiment of the present invention.

Referring to FIG. 3, pitches of each unit tone set by process of FIG. 2 are arranged 300.

After arrangement of pitches of each unit tone, ratio of first unit tone pitch and the second unit tone pitch is calculated 302. Pitch ratio is calculated for all unit tones 304.

For example, unit tone pitch variation of song 'edelweiss' is as follows.

274, 325, 487, 439, 323, 289 . . . .

In above pitch variation, pitch ratio is calculated as follows.

+1.1861, +1.4985, −1.1093, −1.3591, −1.1176 . . . .

After pitch ratio between unit tones is calculated, interval code sequence is generated using the calculated pitch ratio 306.

As pitch ratio is in the form of decimal, it is preferred to be transformed to integer. The interval code is generated by granting predetermined integer value according to pitch ratio.

For example, when pitch ratio is from 1:1.0244 to 1:1.0853, it is determined that there is half tone difference such as mi-fa, do-do# and interval code '1' is given. Further, if pitch ratio is from 1:1.0854 to 1:1.1522, it is determined that there is whole tone difference such as do-re and interval code 2 is given.

Following table 1 is an example of interval code according to pitch ratio.

TABLE 1

| Pitch Ratio | Range | Interval Code (+/−) |
| --- | --- | --- |
| 1:1 (same) | ~1.0243 | 0 |
| 1:1.0594 (semitone) | 1.0244~1.0853 | 1 |
| 1:1.1225 (major 2nd) | 1.0854~1.1522 | 2 |
| 1:1.1892 (minor 3rd) | 1.1523~1.2217 | 3 |

TABLE 1-continued

| Pitch Ratio | Range | Interval Code (+/−) |
|---|---|---|
| 1:1.2599 (major 3rd) | 1.2218~1.2950 | 4 |
| 1:1.3349 (perfect 4th) | 1.2951~1.3724 | 5 |
| 1:1.4142 (augmented 4th) | 1.3725~1.4543 | 6 |
| 1:1.4983 (perfect 5th) | 1.4544~1.5410 | 7 |
| 1:1.5874 (minor 6th) | 1.5411~1.6328 | 8 |
| 1:1.6818 (major 6th) | 1.6329~1.7301 | 9 |
| 1:1.7819 (minor 7th) | 1.7302~1.8331 | 10 |
| 1:1.8877 (major 7th) | 1.8332~1.9421 | 11 |
| 1:2 (1 octave) | 1.9422~ | 12 |

Figure 4:
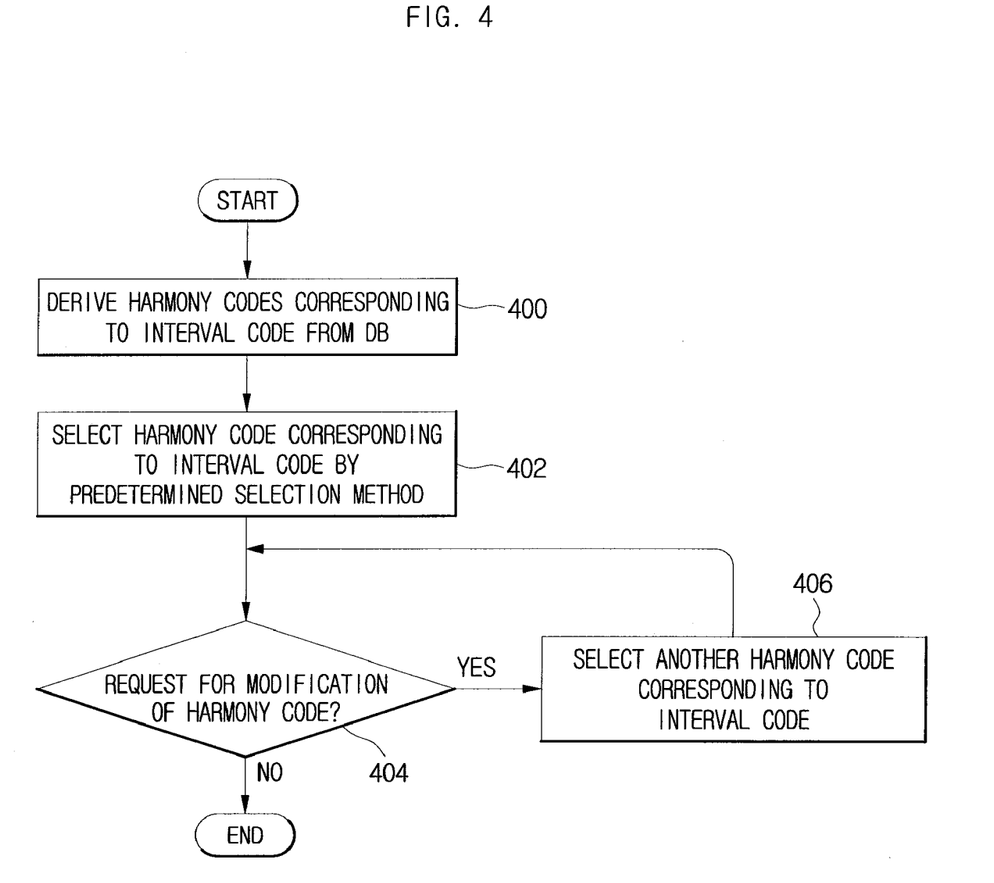
FIG. 4 is a flow chart for generating harmony code according to a preferred embodiment of the present invention.

FIG. 4 is a flow chart for generating harmony code according to a preferred embodiment of the present invention.

Referring to FIG. 4, harmony code corresponding to each interval code is derived from the harmony code database 400.

The harmony code corresponding to each interval code may be stored in the database in the form of matrix, as described above, there may be a number of harmony code series corresponding to one interval code.

For example, when there are 3 harmony code series C-G, C-Em, C-D for a interval code 2, a number of harmony code series are derived from the database.

When a number of harmony code series are derived for one interval code, process for selecting one harmony code series is performed 402.

According to a preferred embodiment of the present invention, an algorithm for selecting the most universal harmony code series based on rhythm genre can be used. The most universal harmony code series based on rhythm genre can be stored in another database or in the harmony code database.

Alternatively, ranking information of harmony code series corresponding to each interval code can be written as additional information. For example, when there are 3 harmony code series (C-G, C-Em, C-D) corresponding to an interval code 2, ranking information C-G (first), C-Em (second), C-D (third) can be written and first ranked harmony code series is selected.

After play based on the selected harmony code series, a user can request modification of the harmony code 404. In response to user's modification request, another harmony code series is selected using the database storing universal harmony code based on rhythm genre 406. Alternatively, when additional information is written in the harmony code database, another harmony code series can be selected using the additional information.

Figure 5:
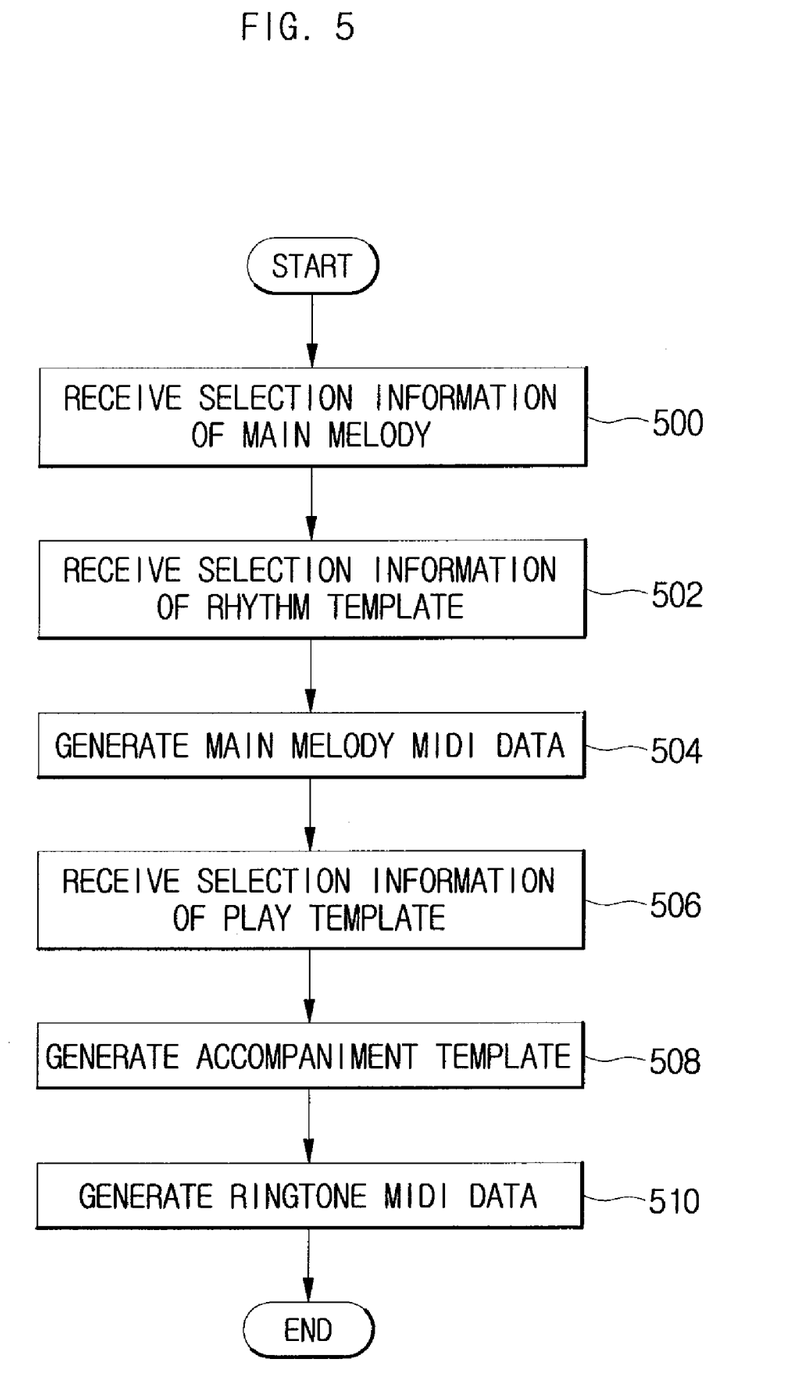
FIG. 5 is a flow chart for generating a final ringtone sound using the harmony code according to a preferred embodiment of the present invention.

FIG. 5 is a flow chart for generating final ringtone sound using the harmony code series according to a preferred embodiment of the present invention.

Referring to FIG. 5, user selects main melody and main melody selection information is received 500. The personal terminal provides main melody information that users can select and users select one main melody among provided main melodies. Interface for requesting to hear main melody tone before selection can be provided.

Further, user selects rhythm template and rhythm template selection information is received 502. The rhythm template can be selected for controlling rhythm when user inputs sound source, or the rhythm template can be selected after generation of harmony code. Interface for selecting rhythm template after generation of harmony code can be provided. The rhythm template may be MIDI-type data, according to an embodiment of the present invention, various type of rhythm templates including pop, rhythm&blues, dance, hiphop&funky and jazz can be pre-stored.

After main melody is selected, MIDI data for selected main melody is generated 504.

Besides main melody and rhythm template, process for selecting play template is performed 506. Play template is a kind of play execution template where various play styles are included. a number of play templates are pre-stored in the form of MIDI data. For example, in the case of acoustic guitar play template, various play templates including stroke, arpeggio can be prepared for one harmony code series.

User can select the main melody, the rhythm template, the play template through GUI of personal terminal, and it would be obvious to those skilled in the art that selection sequence can be varied.

Further, the rhythm template and the play template can be synthetic data, which means rhythm and play data can be included in one template.

After selection of the main melody, the rhythm template, and the play template is completed, accompaniment template is generated by means of merging the template for generated harmony code series, the rhythm template, and the play template 508.

The accompaniment template is merged with the sound source MIDI data (main melody) generated in step 504, and final ringtone sound is generated by combination of the accompaniment template and the sound source MIDI data 510.

Figure 6:
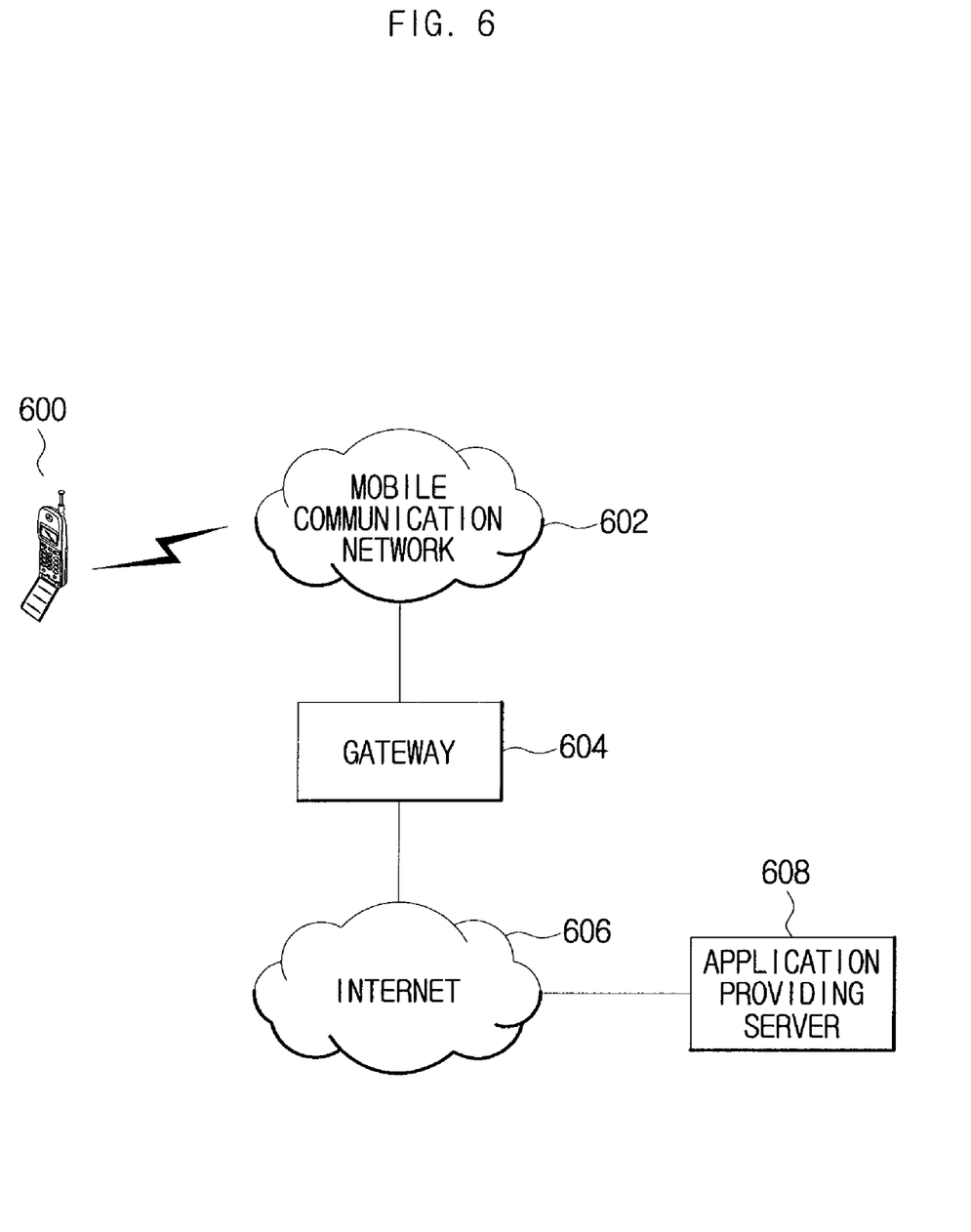
FIG. 6 is an example of system configuration for downloading application in mobile terminal when automatic generation of the ringtone sound is controlled by the application installed in the mobile terminal.

FIG. 6 is an example of system configuration for downloading application in mobile terminal when automatic generation of the ringtone sound is controlled by the application installed in the mobile terminal.

Referring to FIG. 6, User transmits connection request signal to application providing server through mobile terminal 600. The connection request signal generated in the mobile terminal 600 is transmitted to mobile communication network 602. MSC or other control devices in the mobile communication network relays the connection request signal to a gateway 604.

The gateway 604 transforms protocol of connection request signal packet transmitted to the mobile communication network and transmits the transformed connection request signal to the internet, the application providing server 608 receives the connection request signal, allows connection of the mobile terminal and provides webpage by which users can download application.

Users can request download of application through webpage provided by the application providing server and the mobile terminal downloads ringtone sound generation application and installs the downloaded application.

In FIG. 6, case that the mobile terminal to generate the ringtone sound downloads and installs application is illustrated, however, PC can download and install application and the ringtone sound generated by PC can be transferred to mobile terminal.

Figure 7:
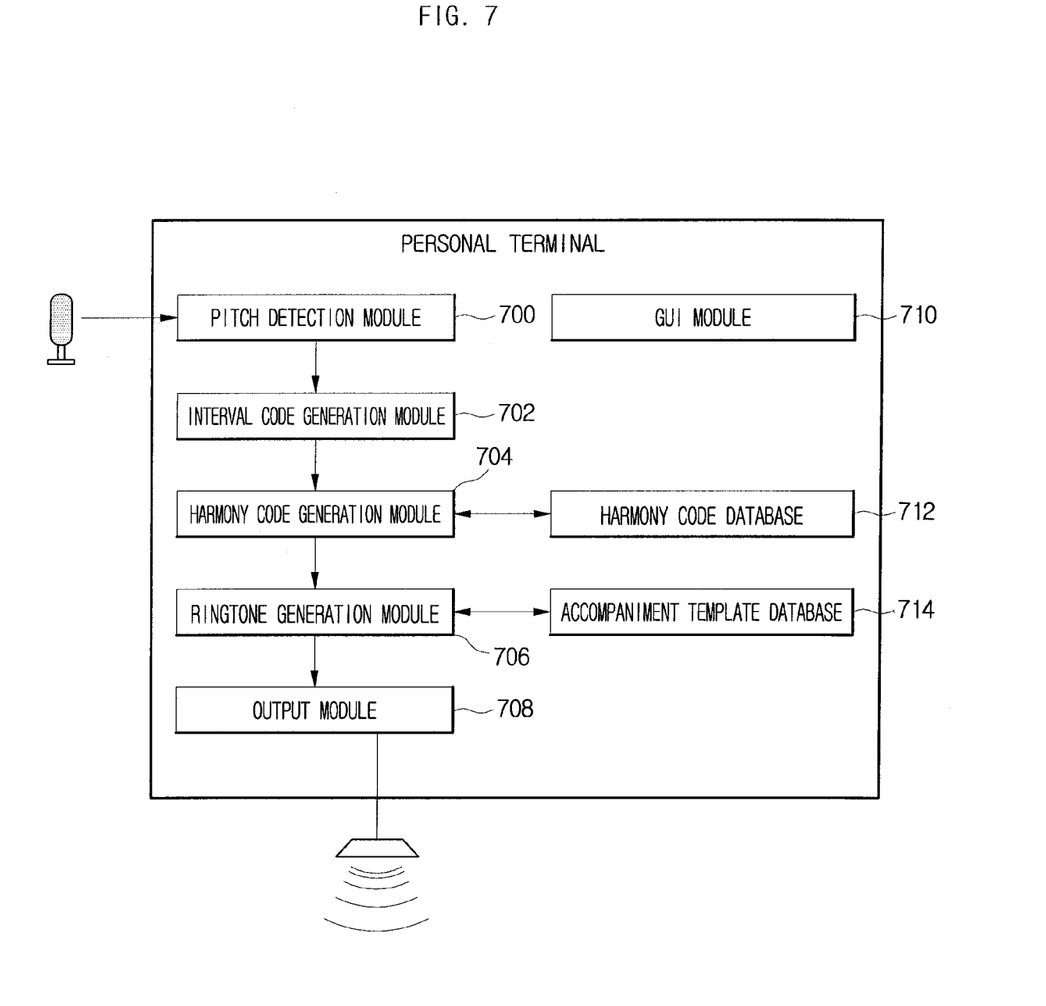
FIG. 7 is module configuration of personal terminal where ringtone sound generation application is installed or ringtone sound generation module is included.

FIG. 7 is module configuration of personal terminal where ringtone sound generation application is installed or ringtone sound generation module is included.

Referring to FIG. 7, the personal terminal according to an embodiment of the present invention may comprise a pitch detection module 700, an interval code generation module 702, a harmony code generation module 704, a ringtone generation module, a output module 708, a GUI module 710, a harmony code database 712 and an accompaniment template database 714.

User inputs sound source through a microphone, the pitch detection module detects pitch of inputted sound source. As described above, rhythm can be outputted for controlling time for inputting sound source, at this case, one of rhythm templates stored in the accompaniment template database is output. The rhythm template to be out can be selected by user or can be set by default.

The pitch detection module 700 detects pitch of inputted sound source and generates unit tone of each frame based on the pitch information.

The interval code generation module 702 generates interval code based on the unit tone pitch ratio information, the unit tone generated by the pitch detection module 700. As described above, for generation of interval code, predetermined integer is given according to unit tone pitch ratio.

The harmony code generation module 704 generates harmony code series corresponding to the interval code series using the information of the harmony code database 712. The generated harmony code series is temporally stored in memory (not shown) in the form of template, and the ringtone sound generation module 706 merges the rhythm template, the play template (the rhythm template and the play template to be merged are based on selection information of user), the harmony code template, and main melody MIDI data corresponding to the inputted sound source, and generates ringtone sound. In accompaniment template database, a number of play templates, and rhythm templates are stored and users can select one of templates in generating ringtone sound.

The GUI module provides graphic interface necessary for performing ringtone generation process. For example, the GUI module provides interface for selecting template, and provides interface for selecting main melody.

The output module 708 outputs generated ringtone sound. Users can request modification of ringtone after listening output ringtone, at this time, users can select another rhythm template and play template, if users request modification of harmony code, the harmony code generation module 704 generates another harmony code series.

Figure 8:
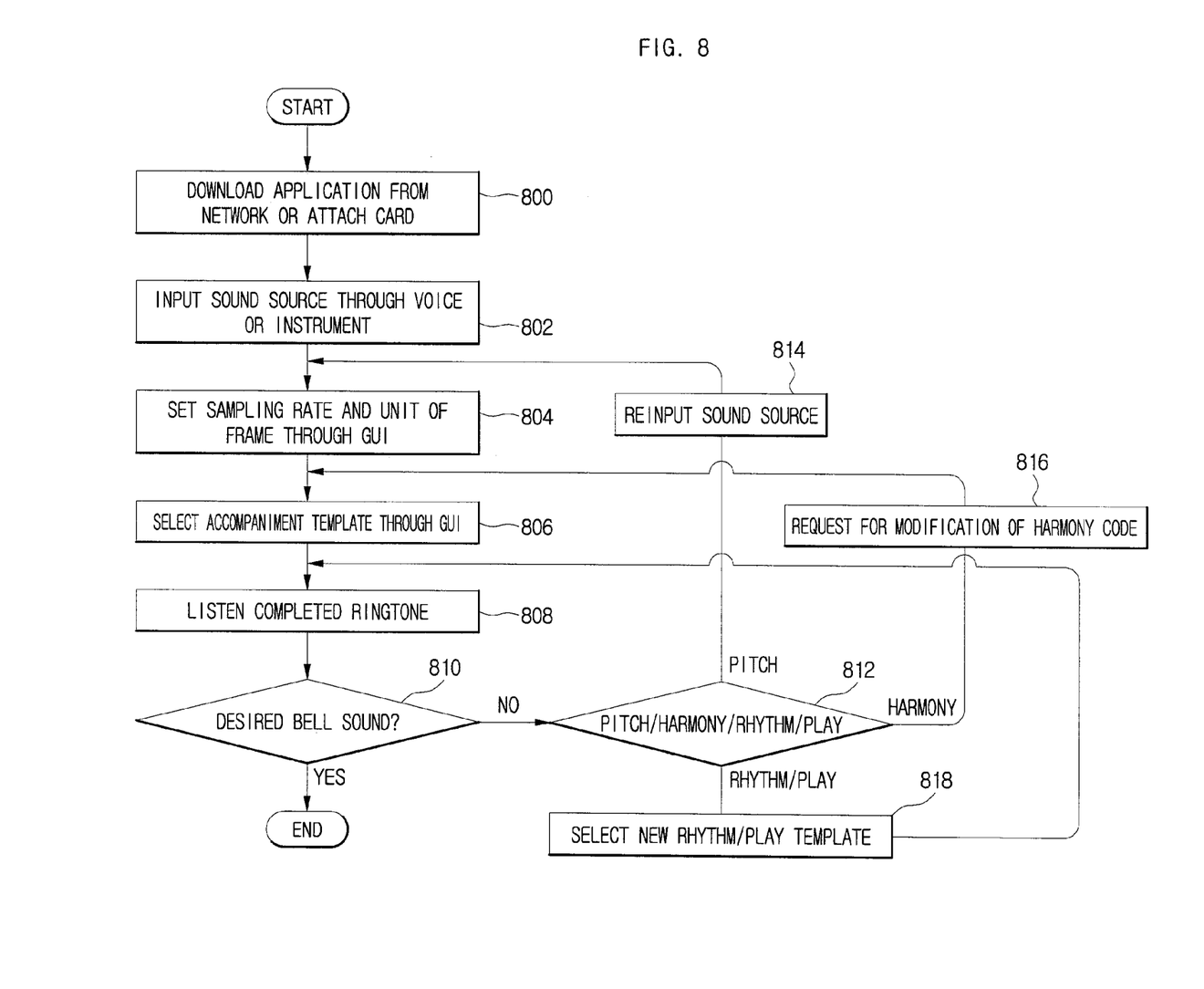
FIG. 8 is an exemplary flow chart for using personal terminal that can generate ringtone sound automatically.

FIG. 8 is an exemplary flow chart for using personal terminal that can generate ringtone sound automatically.

Referring to FIG. 8, user downloads application for automatic ringtone generation in personal terminal through network, or user attaches card for automatic ringtone generation to personal terminal 800. Of course, when personal terminal provides automatic ringtone generation, this process is not required.

User inputs sound source using voice or an instrument 802. In inputting sound source, as described above, user can select a rhythm template and input sound source in accordance of the rhythm.

User sets sampling rate and frame unit using displayed GUI 804. Alternatively, the sampling rate and frame unit can be set by default.

The GUI module of personal terminal provides by which user can select the play template, user selects the play template to be used in ringtone generation. The rhythm template can also be selected if users did not select rhythm template in inputting sound source 806.

After selection is completed, ringtone MIDI data is generated in personal terminal, the generated ringtone is outputted, and user can listen the ringtone 808. If the generated ringtone sound is not a desired sound, user can request modification of the sound 810. At this time, user can request modification for one of pitch, harmony, and rhythm/play template 812.

When there is problem in pitch, user can re-input sound source 814.

When there is problem in harmony code, user requests modification of harmony code 816, personal terminal outputs ringtone with new harmony code.

When there is problem in rhythm/play template, user selects new rhythm/play template and ringtone with selected template is outputted again 818.

Since the accompanying drawings and the detailed description are only examples of the present invention, it is only for describing the present invention not for limiting the scope of the present invention. Therefore, those who skilled in the art will understand that many changes and equivalent embodiments can be made without departing from the present invention. Thus, the true scope of the present invention must be determined by the accompanying claims.

INDUSTRIAL APPLICABILITY

As described above, according to the preferred embodiment of the method for generating audio data automatically and a personal terminal and a recorded medium using the same, polyphonic ringtone can be generated in personal terminal without downloading process.

Further, according to the preferred embodiment of the present invention, polyphonic ringtone sound can be generated using user's voice or sound generated by instrument play.

Moreover, according to the preferred embodiment of the present invention, various ringtone sounds can be generated which meet user's individuality.

The invention claimed is:

1. A method for generating audio data automatically comprising the steps of:
   (a) detecting pitch of inputted sound source;
   (b) generating a unit tone data using variation information of the detected pitch;
   (c) generating an interval code using ratio information of unit tone included in the unit tone data;
   (d) generating a harmony code based on the generated interval code;
   (e) generating an accompaniment template using the harmony code and pre-stored accompaniment related template; and
   (f) generating an audio data where main melody of the inputted sound source and the accompaniment data are merged,
   wherein the step (c) comprises the steps of:
   (a) calculating ratio of sequential unit tones; and
   (b) transforming the ratio into a predetermined value by referring to a transformation table.

2. The method of claim 1, wherein, in the step (a), the pitch is detected for each frame having a predetermined number of samples.

3. The method of claim 1, wherein the step (b) comprises the steps of:
   (a) determining if pitch difference of sequential frames is less than a predetermined critical value;
   (b) grouping sequential frames of which pitch difference is less than the predetermined critical value;
   (c) calculating average pitch of grouped sequential frames; and
   (d) setting the average pitch as a unit tone of grouped sequential frames.

4. The method of claim 1, wherein, in the step (d), the harmony code is generated using information of a harmony code database where harmony code information corresponding to each of interval code is stored.

5. The method of claim 4, wherein the harmony code database stores a number of harmony codes corresponding to one interval code in the form of matrix.

6. The method of claim 4, wherein a number of harmony codes corresponding to one interval code are stored in the harmony code database, one harmony code series is selected by a predetermined selection method among the harmony code series corresponding to one interval code.

7. The method of claim 1, wherein the accompaniment related template comprises a rhythm template and a play template.

8. The method of claim 1, wherein a number of rhythm templates and play templates are pre-stored, selected rhythm template and play template by user are merged with the accompaniment template.

9. The method of claim 7, wherein rhythm of the rhythm template is outputted when the sound source is inputted.

10. A recorded medium readable by a digital processing device, tangibly embodying a program of instructions executable by the digital processing device for performing method of generating audio signal automatically, said method comprising the steps of:
    (a) detecting pitch of inputted sound source;
    (b) generating a unit tone data using variation information of the detected pitch;
    (c) generating an interval code using ratio information of unit tone included in the unit tone data;
    (d) generating a harmony code based on the generated interval code;
    (e) generating an accompaniment template using the harmony code and pre-stored accompaniment related template; and
    (f) generating an audio data where main melody of the inputted sound source and the accompaniment data are merged
    wherein the step (c) comprises the steps of:
    (a) calculating ratio of sequential unit tones; and
    (b) transforming the ratio into a predetermined value by referring to a transformation table.

11. The recorded medium of claim 10, wherein, in the step (a), the pitch is detected for each frame having predetermined number of samples.

12. The recorded medium of claim 10, wherein the step (b) comprises the steps of:
    (a) determining if pitch difference of sequential frames is less than a predetermined critical value;
    (b) grouping sequential frames of which pitch difference is less than the predetermined critical value;
    (c) calculating average pitch of grouped sequential frames; and
    (d) setting the average pitch as unit tone of grouped sequential frames.

13. The recorded medium of claim 10, wherein, in the step (d), the harmony code is generated using information of a harmony code database where harmony code information corresponding to each of interval code is stored.

14. The recorded medium of claim 13, wherein the harmony code database stores a number of harmony codes corresponding to one interval code in the form of matrix.

15. The recorded medium of claim 13, wherein a number of harmony codes corresponding to one interval code are stored in the harmony code database, one harmony code is selected by a predetermined selection method among the harmony code series corresponding to one interval code series.

16. The recorded medium of claim 13, the accompaniment related template comprises a rhythm template and a play template.

17. A personal terminal for generating audio signal automatically comprising:
    (a) a pitch detection part for detecting pitch of inputted sound source and generating unit tone data using variation information of the detected pitch;
    (b) an interval code generating part for generating an interval code using ratio information of unit tone included in the unit tone data;
    (c) a harmony code generation part for generating a harmony code corresponding to the generated interval code using data stored in a harmony code database;
    (d) an accompaniment template generation part for generating an accompaniment template using a harmony template generated based on the harmony code data generated by the harmony code generation part and pre-stored accompaniment related template; and
    (e) an audio data generation part for generating an audio data by merging main melody data generated through pitch analysis for the inputted sound source and the accompaniment template
    wherein the interval code generation part calculates ratio of sequential unit tones and transforms the ratio into a predetermined value by referring to a transformation table.

18. The terminal of claim 17, wherein the pitch detection part detects pitch for each frame having predetermined number of samples.

19. The terminal of claim 17, wherein the pitch detection part determines if pitch difference of sequential frames is less than a predetermined critical value, groups sequential frames of which pitch difference is less than the predetermined critical value, calculates average pitch of grouped sequential frames; and sets the average pitch as unit tone of grouped sequential frames.

* * * * *